United States Patent [19]
Lynn

[11] Patent Number: 6,044,584
[45] Date of Patent: Apr. 4, 2000

[54] BUG BLOTTER

[76] Inventor: Arthur Lynn, 770 Ocean Pkwy., Brooklyn, N.Y. 11230

[21] Appl. No.: 09/144,038

[22] Filed: Aug. 31, 1998

[51] Int. Cl.[7] ................................................. A01M 3/04
[52] U.S. Cl. ............................................................ 43/136
[58] Field of Search ....................................... 43/115, 136

[56] References Cited

U.S. PATENT DOCUMENTS

| | | |
|---|---|---|
| 1,239,703 | 9/1917 | Leaman, Jr. . |
| 1,888,563 | 11/1932 | Nixon ........................................ 43/136 |
| 3,449,856 | 6/1969 | Weaver ...................................... 43/136 |
| 4,052,811 | 10/1977 | Shuster et al. ............................. 43/136 |
| 4,126,959 | 11/1978 | Graham ..................................... 43/136 |
| 4,914,855 | 4/1990 | Sherman .................................... 43/136 |

*Primary Examiner*—Robert P. Swiatek
*Attorney, Agent, or Firm*—Michael I Kroll

[57] ABSTRACT

An insect adhering device for catching bugs and insects and providing easy disposal of the trapped insects. The insect adhering device includes an adhesive member having a top side and a bottom side and a plurality of adhesive strips detachably positioned in a layered manner on the top side of the adhesive member. A pole is releasably connected to the bottom side of the adhesive member wherein a user directs the adhesive member via the pole to position in which a topmost one of the plurality of adhesive strips in contact with the bug or insect causing the bug or insect to adhere to the topmost adhesive strip and thereby trap the bug or insect. A cover is also provided for selectively protecting the plurality of adhesive strips and the adhesive member from the environment surrounding the device. Each of the plurality of adhesive strips include a piece of adhesive tape having a first side and a second side, an adhesive substance positioned on both the first and second sides of the adhesive tape and a piece of wax paper secured to the first side of the adhesive tape by the adhesive substance on the first side, the length of each piece of wax paper is greater than its respective piece of adhesive tape secured thereto thereby forming a tab on either side of the piece of adhesive tape for use in removing the adhesive strip from the stack formed by the plurality of adhesive strips.

19 Claims, 7 Drawing Sheets

BUG BLOTTER

BACKGROUND OF THE INVENTION

1. Field of the Invention

The present invention relates generally to devices for catching bugs and insects and, more specifically, to a device for reaching and catching bugs and insects crawling on floors, walls and ceilings allowing the user to easily reach the bugs and/or insects and eliminating any mess.

2. Description of the Prior Art

Numerous types of devices for catching bugs and/or insects have been provided in the prior art. For example, U.S. Pat. Nos. 1,239,703; 3,449,856; 4,052,811 and 4,914,855 all are illustrative of such prior art. While these units may be suitable for the particular purpose to which they address, they would not be as suitable for the purposes of the present invention as heretofore described.

U.S. Pat. No. 1,239,703

Inventor: William Henry Leaman Jr.

Issued: Sep. 11, 1917

This United States Patent discloses an improved holder for flypaper, whereby flies may be caught on the wall, ceilings or upon any other surface by means of a flanged body having improved means for detachably holding a sheet of fly paper, whereby, when the flanged body is placed over a fly on the wall or ceiling, the fly will endeavor to escape in the direction of the flypaper and become caught owing to the flanges of the body preventing the escape of the fly in different directions.

U.S. Pat. No. 3,449,856

Inventor: Ted T. Weaver

Issued: Jun. 17, 1969

A fly catcher comprising an elongated handle releasably attached to a light-weight, throw-away type head member of thin, clear, transparent, plastic material coated on one side thereof with a non-drying, tacky, adhesive substance which will retain a fly upon contact therewith, the head member being shaped for nesting, together with a plurality of similar head members, and being shaped so as to be optionally attached in a package so as to be free for separate removal of individual head members for successive attachment to the handle.

U.S. Pat. No. 4,052,811

Inventor: Shuster et al.

Issued: Oct. 11, 1977

Insects crawling on inaccessible surfaces are contacted by a tacky adhesive face of a flexible tape backed by a sponge-like pad projecting from a rigid body attached to the end of an elongated handle. A section of the tape with an insect adhered thereto may be detached and the sponge-like pad used for cleaning.

U.S. Pat. No. 4,914,855

Inventor: Ronald Sherman

Issued: Apr. 10, 1990

The insect pickup device is comprised of a plurality of detachable components including a first elongated head having a triangular cross sectional configuration, an elongated handle structure having the first and second heads detachably secured at opposite ends thereof. The handle structure includes a plurality of tubular members and a dowel for interconnecting the tubular members to provide an elongated handle structure.

SUMMARY OF THE PRESENT INVENTION

The present invention relates generally to devices for catching bugs and insects and, more specifically, to a device for reaching and catching bugs and insects crawling on floors, walls and ceilings allowing the user to easily reach the bugs and/or insects and remove any mess.

A primary object of the present invention is to provide an insect adhering device that will overcome the shortcomings of prior art devices.

Another object of the present invention is to provide an insect adhering device which is able to aid a user in easily reaching and catching insects and bugs on walls, floors and ceilings.

A further object of the present invention is to provide an insect adhering device which is able to catch insects and bugs without leaving a mess in the area on which they are caught.

A yet further object of the present invention is to provide an insect adhering device including a plurality of adhesive strips detachably arranged in layered fashion, the plurality of adhesive strips being positioned on an adhering member, the topmost adhesive strip acting to catch the insect and/or bug.

A still further object of the present invention is to provide an insect adhering device including a pole releasably connected to the adhering member for increasing the reach of the device to thereby allow the user to catch bugs and/or insects in high places such as on a ceiling.

A further object of the present invention is to provide an insect adhering device wherein each of the plurality of adhesive strips have adhesive material on both sides thereof and are attached on one side to a strip of wax paper.

Another object of the present invention is to provide an insect adhering device wherein the strip of wax paper has a length longer than the length of the adhesive strip attached thereto, providing a tab for removing the topmost adhesive strip from the plurality of layered adhesive strips.

Another object of the present invention is to provide an insect adhering device that is simple and easy to use.

A still further object of the present invention is to provide an insect adhering device that is economical in cost to manufacture.

Additional objects of the present invention will appear as the description proceeds.

An insect adhering device for catching bugs and insects and providing easy disposal of the trapped insects is disclosed by the present invention. The insect adhering device includes an adhesive member having a top side and a bottom side and a plurality of adhesive strips detachably positioned in a layered manner on the top side of the adhesive member. A pole is releasably connected to the bottom side of the adhesive member wherein a user directs the adhesive member via the pole to position in which a topmost one of the plurality of adhesive strips in contact with the bug or insect causing the bug or insect to adhere to the topmost adhesive strip and thereby trap the bug or insect. A cover is also provided for selectively protecting the plurality of adhesive strips and the adhesive member from the environment surrounding said device. Each of the plurality of adhesive strips include a piece of adhesive tape having a first side and a second side, an adhesive substance positioned on both said first and second sides of said adhesive tape and a piece of wax paper secured to said first side of said adhesive tape by said adhesive substance on said first side, the length of each piece of wax paper is greater than its respective piece of adhesive tape secured thereto thereby forming a tab on either side of said piece of adhesive tape for use in removing the adhesive strip from the stack formed by the plurality of adhesive strips.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the insect adhering device of the present invention. With regard to the reference numerals used, the following numbering is used throughout the various drawing figures.

10 insect adhering device of the present invention
12 user of the insect adhering device
14 bug or insect
16 ceiling on which bug or insect is positioned
18 room
20 adhering member
22 pole
24 base of adhering member
26 plurality of adhesive strips
28 base of adhering member
30 angle at which pole extends from adhering member
32 topmost adhesive strip
34 adhesive tape
36 adhesive substance
38 wax paper
40 first tab
42 second tab
44 arrow indicating direction at which first tab is pulled for removal
46 arrow indicating direction at which second tab is pulled for removal
48 recess in base section of adhering member
50 fold in adhesive strip
52 first side of folded adhesive strip
54 second side of folded adhesive strip
56 cover
58 side of adhering member
60 side of cover
62 protrusions extending from side of cover and into cover
64 inner side of cover
66 top side of adhesive member
68 recess in bottom side of adhesive member
70 thread spiraling around recess in bottom side of adhesive member
"A" typically 45°

DETAILED DESCRIPTION OF THE PREFERRED EMBODIMENT

Turning now descriptively to the drawings, in which similar reference characters denote similar elements throughout the several views, FIGS. 1 through 6 illustrate the insect adhering device of the present invention indicated generally by the numeral 10.

Figure 1:
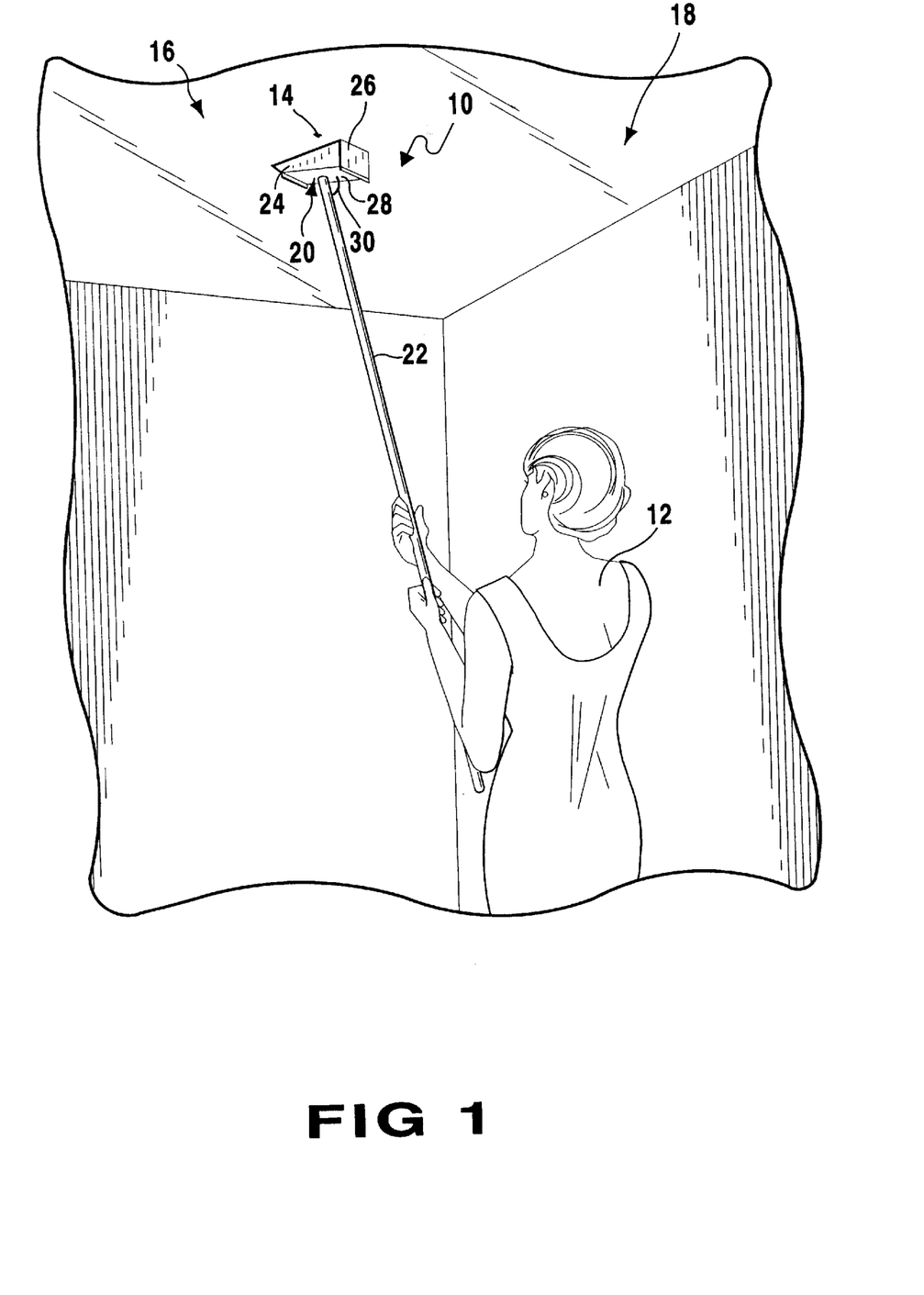
FIG. 1 is a top perspective view of a person using the insect adhering device of the present invention to catch an insect.

FIG. 1 illustrates the insect adhering device 10 of the present invention being used by a person 12 to catch a bug or insect 14 positioned on a ceiling 16 of a room 18. The insect adhering device 10 includes an adhering member 20 and a pole 22 removably connected thereto. The adhering member 20 includes a base 24 and a plurality of adhesive strips 26 positioned on a face side of the base 24. The plurality of adhesive strips 26 are positioned in layered fashion and are detachable from one another. The pole 22 extends from a bottom side 28 of the base 24 opposing the face side. The pole 22 preferably extends at an angle 30 from the bottom side 28 allowing the user 12 to apply the face side flush against the ceiling 16 from a distance laterally displaced from the bug or insect 14. The pole may be in the form of a broom stick. The user 12 can thus easily reach over objects such as tables and chairs to reach a bug or insect 14 positioned thereover.

Figure 2:
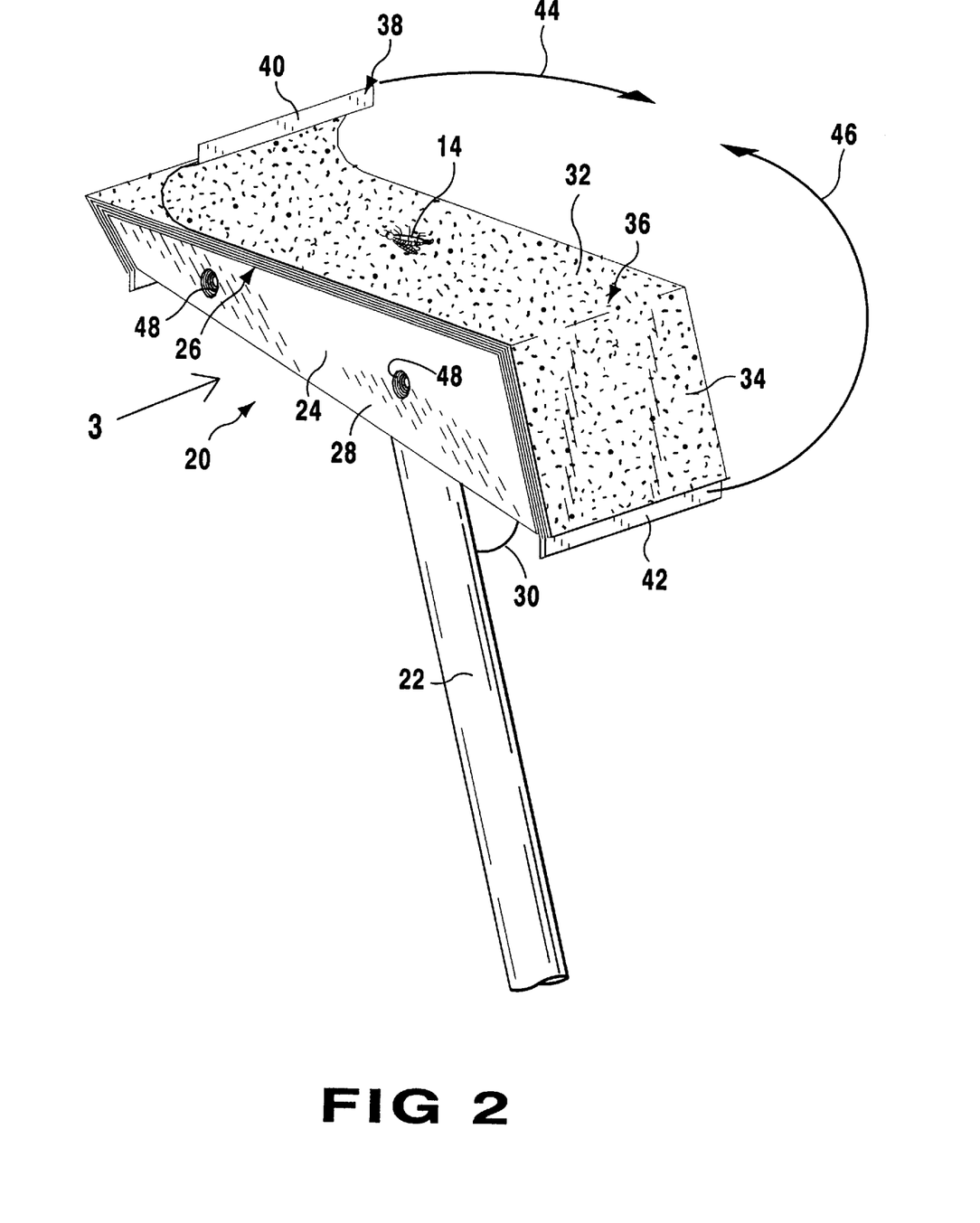
FIG. 2 is an enlarged view of an insect attached to a topmost adhesive layer of the insect adhering device of the present invention.

A top perspective view of the insect adhering device 10 is illustrated in FIG. 2. This figure illustrates a bug 14 adhered to the topmost adhesive strip 32. Each of the plurality of adhesive strips 26 includes a piece of adhesive tape 34 having an adhesive substance 36 on either side thereof and a strip of wax paper 38 adhered to one side of the adhesive tape 34. The wax paper 38 has a length greater than the length of the adhesive tape 34. The adhesive tape 34 is adhered to a central position of the wax paper 38 thereby providing a first tab 40 formed by the wax paper 38 extending from one side of the adhesive tape 34 and a second tab 42 formed of the wax paper 38 extending from an opposing side of the adhesive tape 34. The tabs 40 and 42 provide the user 12 with a means for easily removing a topmost adhesive strip 32 from the plurality of adhesive strips 26. In order to remove the topmost adhesive strip 32 from the plurality of adhesive strips 26 the user 12 will grasp the first tab 40 and pull the first tab 40 in the direction of the arrow labeled 44. The user 12 will then grasp the second tab 42 and pull the second tab 42 in the direction of the arrow labeled 46, towards the first tab 40. On either side of the base section 24 are recesses 48 for engaging a cover as will be described hereinafter with specific reference to FIGS. 4 and 5.

Figure 2A:
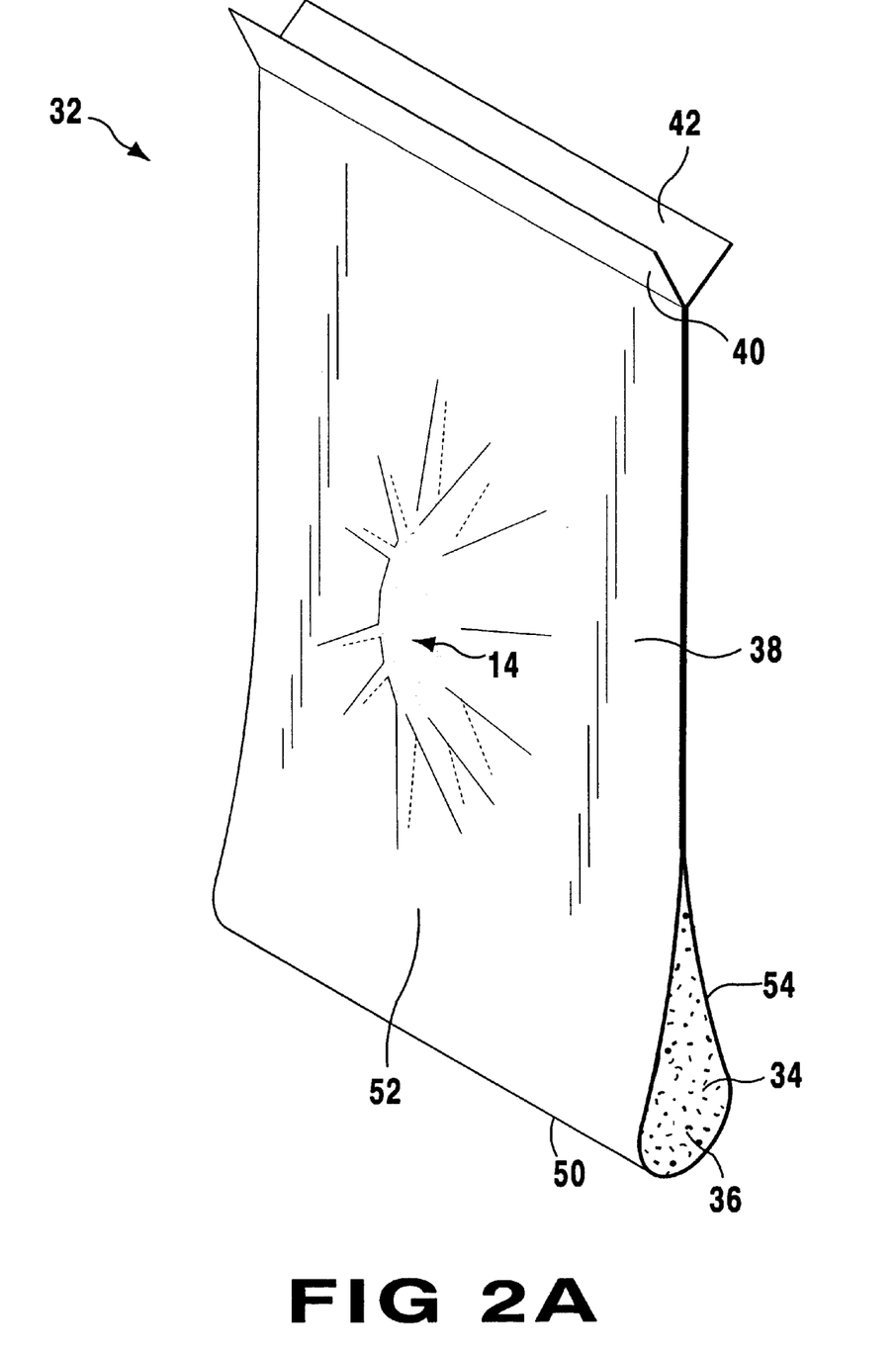
FIG. 2A is an enlarged view of a folded adhesive layer of the insect adhering device of the present invention removed from the plurality of adhesive layers and retaining an insect therein.

FIG. 2A illustrates an adhesive strip 32 after removal from the plurality of adhesive strips 26. The adhesive strip 32 has been removed from the plurality of adhesive strips 26 by pulling the tabs 40 and 42 as illustrated in FIG. 2 and forming a fold 50 at a mid section of the adhesive strip 32. The fold 50 forms a first side 52 and a second side 54 which, when folded over, are caused to adhere together. The adherence of the first and second sides 52 and 54, respectively, causes any bug 14 adhered to the adhesive tape 34 to be trapped therebetween.

Figure 3:
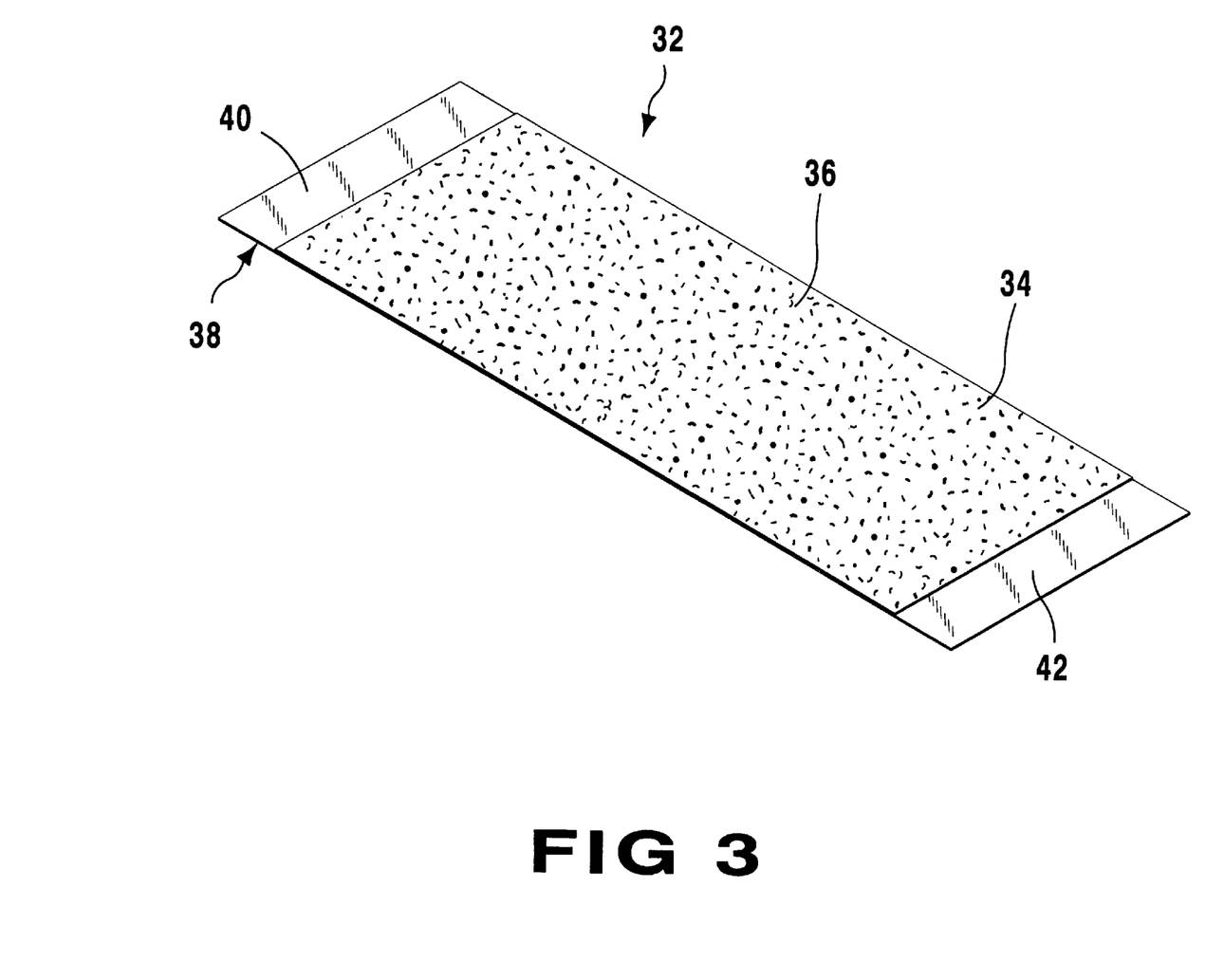
FIG. 3 is a side perspective view of one of the plurality of adhesive layers of the insect adhering device of the present invention.

A single adhesive strip 32 is illustrated in FIG. 3. From this view the adhesive tape 34 and the wax paper 38 adhered to a bottom side of the adhesive tape 34 can be seen. The adhesive tape 34 has an adhesive substance 36 positioned on both sides thereof. The adhesive substance 36 on the bottom side thereof causes the adhesive tape 34 to adhere to the wax paper 38. The length of the wax paper 38 is greater than the length of the adhesive tape 34. The adhesive tape 34 is adhered to a central position of the wax paper 38 forming the first and second tabs 40 and 42, respectively. The plurality of adhesive strips 26 is formed by aligning one adhesive strip 32 atop another to form a layered stack. The bottom side of the wax paper 38 of one adhesive strip 32 is positioned atop the adhesive tape 34 of an adhesive strip 32 positioned therebelow to detachably adhere the adhesive strips 32 together. Additional adhesive strips 32 are positioned in the same manner, one atop the other to form the plurality of layered adhesive strips 26. The topmost adhesive strip 32 is removed from the layered stack by pulling on the first and second tabs 40 and 42 in the direction of the arrows labeled 42 and 44 as shown in FIG. 2.

Figure 4:
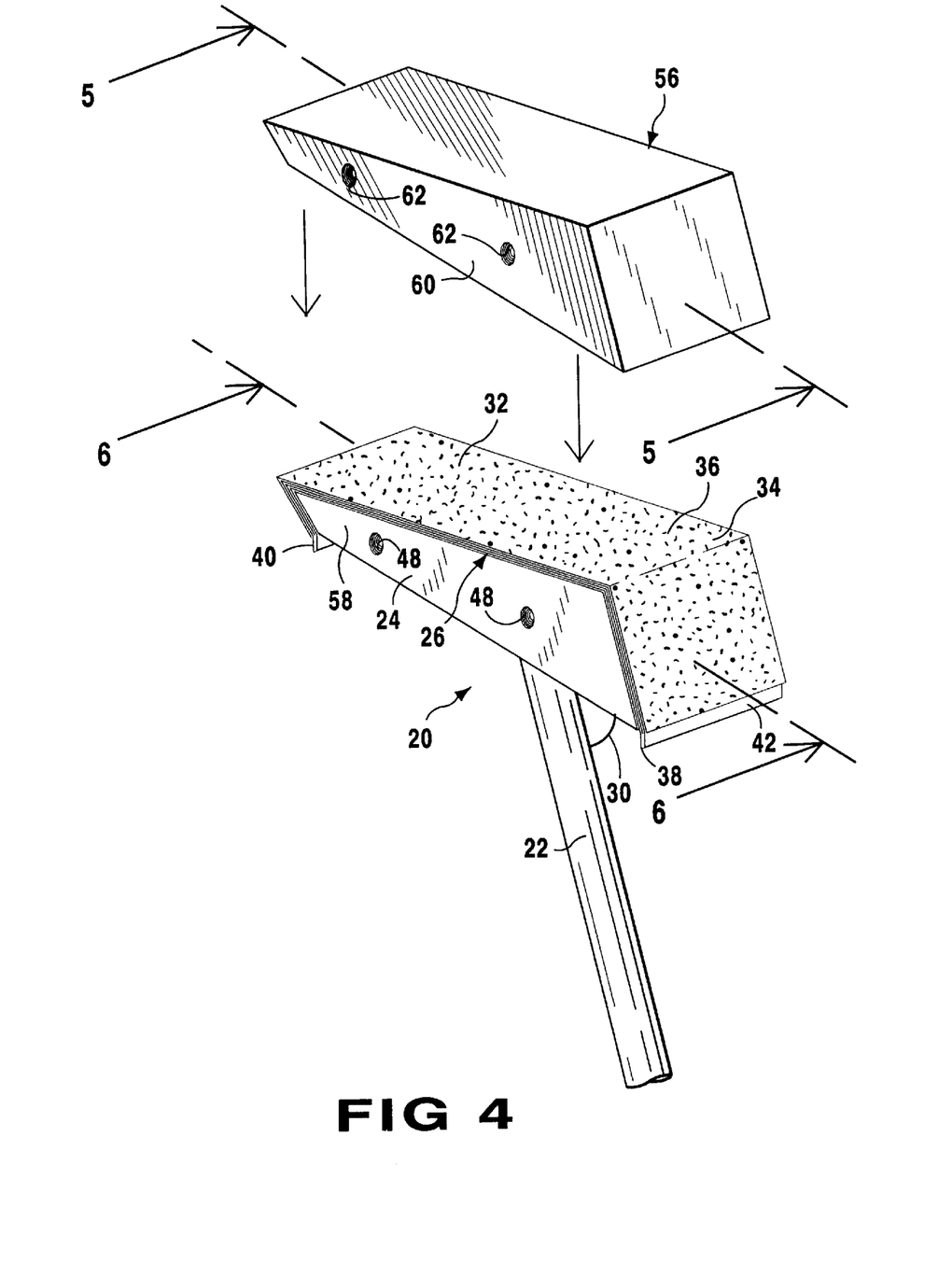
FIG. 4 is a side perspective view of the insect adhering device of the present invention including a removable cover for protecting the plurality of adhesive layers when not in use.

An exploded view of the adhering member 20 along with the pole 22 extending therefrom and a cover 56 is illustrated in FIG. 4. This figure illustrates the plurality of adhesive strips 26 positioned atop the base 24 and the pole 22 extending from the bottom side of the base 24. Positioned on a side 58 of the base 24 are recesses 48. A cover 56 is provided for selectively covering the plurality of adhesive strips 26 and thereby protecting the adhesive strips 26 from the elements when not in use. The cover 56 is hollow and has a shape substantially equal to that of the adhesive member 20. Extending from a side 60 of the cover 56 and into the an inner side of the cover 56 is a protrusion 62. When the cover 56 is positioned atop the adhesive member 20, the protrusions 62 are received by the recesses 48 in the adhesive member 20 thereby selectively securing the cover 56 to the adhesive member 20.

While a preferred mechanism for selectively connecting the cover to the adhesive member is shown and described herein, those of ordinary skill in the art who have read the description will appreciate that there are numerous other mechanisms for selectively connecting the cover to the adhesive member and, therefore, as used herein the phrase "means for selectively connecting the cover to the adhesive member" should be construed as including all such mechanisms as long as they achieve the desired result of selectively connecting the cover to the adhesive member, and, therefore, that all such equivalent mechanisms are to be considered as equivalents to the one described herein.

Figure 5:
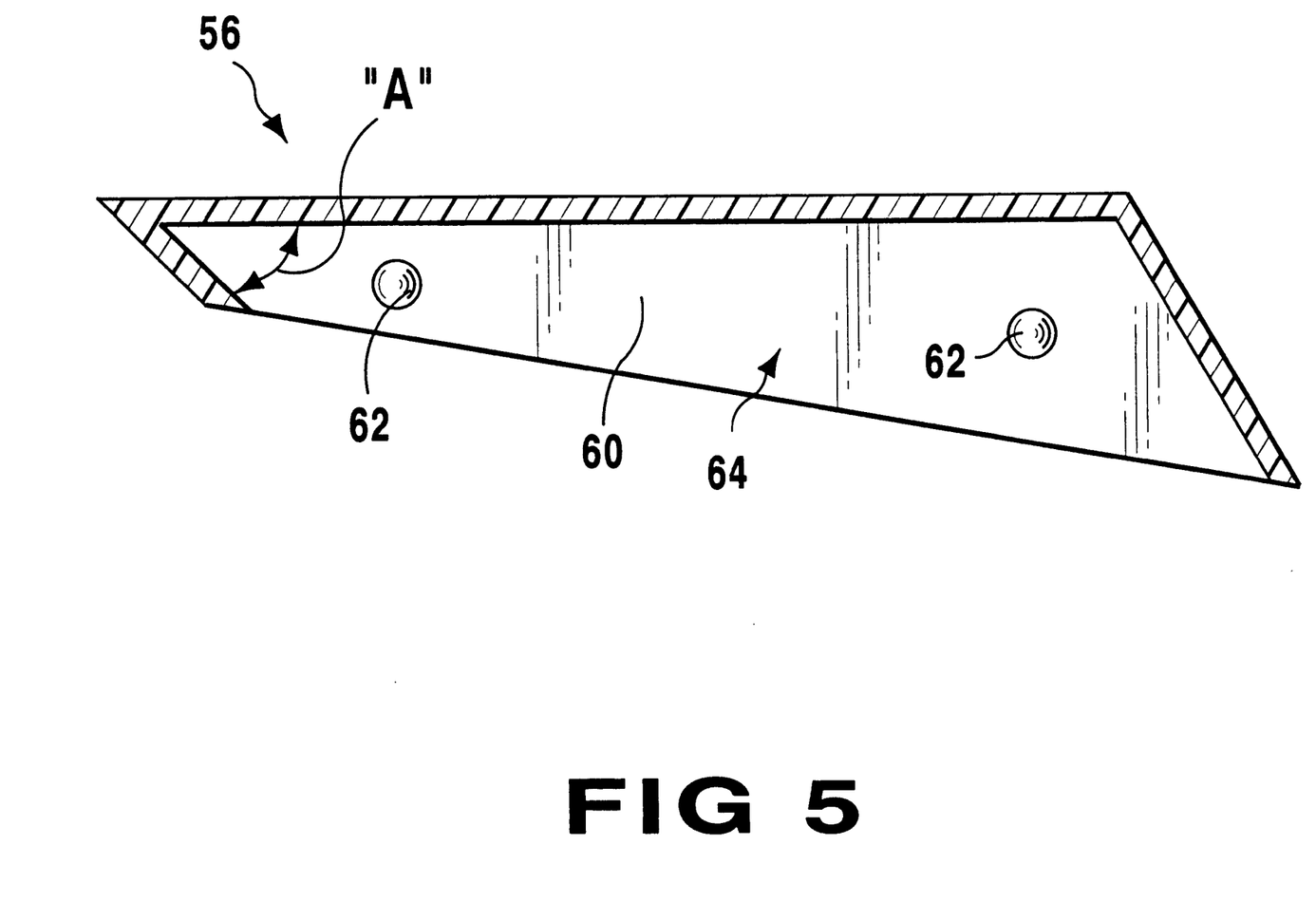
FIG. 5 is a cross-sectional view of the cover of the insect adhering device of the present invention.

A cross-section of the cover is illustrated in FIG. 5. From this view the inner side 64 of the cover 56 can be seen. The adhesive member 20 is received within the inner side 64 when the cover 56 is positioned thereon. The protrusions 62 extend from the side 60 of the cover 56 and into the inner side 64.

Figure 6:
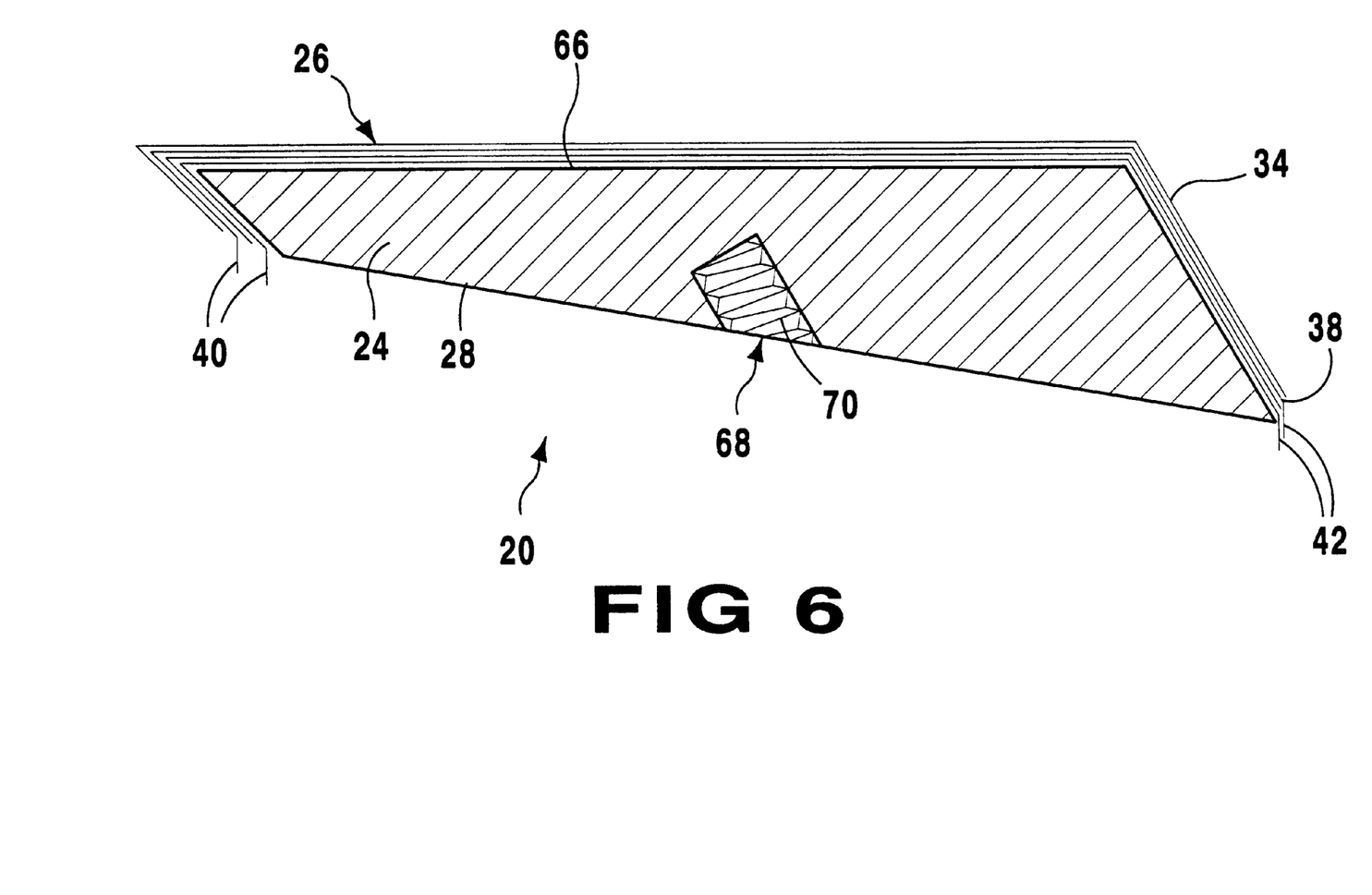
FIG. 6 is a cross-sectional view of the insect adhering section of the insect adhering device of the present invention.

A cross-sectional view of the adhering member 20 is illustrated in FIG. 6. The plurality of adhesive strips 26 are shown positioned on a top side 66 thereof. Extending into the bottom side 28 is a recess 68 for releasably receiving an end of the pole 22 therein. The recess 68 has a thread 70 spiraling therearound for mating with a thread around a top end of the pole 22. The bottom side 28 extends at an angle to the top side 66. The angle between the top side 66 and the bottom side 28 allows the user 12 to extend the pole 22 at an angle and retain the top side 66 in a position parallel to the surface on which the bug or insect 14 is positioned as illustrated in FIG. 1. Thus, the user 12 is able to reach over large objects such as sofas, tables, desks, etc. without needing to move such objects.

While a preferred mechanism for releasably connecting the pole and adhesive member is shown and described herein, those of ordinary skill in the art who have read the description will appreciate that there are numerous other mechanisms for releasably connecting the pole and adhesive member and, therefore, as used herein the phrase "means for releasably connecting the pole and adhesive member" should be construed as including all such mechanisms as long as they achieve the desired result of releasably connecting the pole and adhesive member, and, therefore, that all such equivalent mechanisms are to be considered as equivalents to the one described herein.

The operation of the insect adhering device 10 will now be described with reference to the figures. In operation, the insect adhering device 10 is provided with a plurality of adhesive strips 26 positioned on the top side 66 of the adhering member 20. The cover 56 is positioned atop the adhering member 20 and releasably secured thereto. The protrusions 62 extending into the inner side 64 are received by the recesses 48 in the base 24.

When it is desired to catch a bug or insect 14, the cover 56 is removed from the adhering member 20 by applying a force in a direction away from the adhering member 20 to thereby expose the topmost adhesive strip 32. If the bug or insect 14 is positioned in a hard to reach or high place such as the ceiling 16 of a room 18, the pole 22 may be inserted in the recess 68 in the bottom side 28 of the base 24. In the embodiment shown in the figures, the pole 22 is inserted in the recess 68 and turned in a clockwise direction such that a thread spiraling around a top side of the pole 22 engages the thread 70 within the recess 68.

The user 12 will now grasp the pole 22 and move the adhesive member 20 to a position directly below the bug or insect 14. The adhesive member 20 is then moved closer to the bug or insect 14 until it contacts the bug or insect 14. The bug or insect 14 will adhere to the adhesive substance 36 on the top side of the topmost adhesive strip 32 and thereby be caught.

The user will now lower the adhesive member 20 so as to reach the topmost adhesive strip 32. The first and second tabs 40 and 42 will be grasped by the user 12 and pulled in the direction of the arrows labeled 44 and 46. This will cause the wax paper 38 of the adhesive strip 32 to become disengaged from the adhesive substance 36 on the adhesive strip 32 therebelow. The top most adhesive strip 32 is therefore removed from the plurality of layered adhesive strips 26 positioned on the top side 66 of the base 24. The removed adhesive strip 32 will be folded over to form the fold 50 and cause the adhesive substance 36 on a first side 52 to adhere to the adhesive substance 36 on the second side 54 trapping the bug or insect 14 therebetween. The removed adhesive strip 32 is then disposed of.

The pole 22 is now removed from the recess 68 by turning in a counterclockwise direction causing the threads to be disengaged. The cover 56 is then positioned atop the adhesive member 20, receiving the adhesive member 20 in its inner side 64. The protrusions 62 are received by the recesses 48 in the base 24 thereby selectively securing the cover 56 to the adhesive member 20. The insect adhering device 10 is now stored until needed in the future.

From the above description it can be seen that the insect adhering device of the present invention is able to overcome the shortcomings of prior art devices by providing a insect adhering device which is able to aid a user in easily reaching and catching insects and bugs on walls, floors and ceilings and catch insects and bugs without leaving a mess in the area on which they are caught. The insect adhering device includes a plurality of adhesive strips detachably arranged in layered fashion, each of the plurality of adhesive strips have adhesive material on both sides thereof and are attached on one side to a strip of wax paper. The strip of wax paper has a length longer than the length of the adhesive strip attached thereto, providing a tab for removing the topmost adhesive strip from the plurality of layered adhesive strips. The insect adhering device also includes an adhering member on which the plurality of adhesive strips are positioned and a pole releasably connected to the adhering member for increasing the reach of the device to thereby allow the user to catch bugs and/or insects in high places such as on a ceiling whereby the topmost adhesive strip acts to catch the insect and/or bug. Furthermore, the insect adhering device of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An insect adhering device for catching at least one of bugs and insects and providing easy disposal of the trapped insects, said insect adhering device comprising:

a) an adhesive member having a top side and a bottom side;

b) a plurality of adhesive strips detachably positioned in a layered manner on said top side of said adhesive member, wherein each of said plurality of adhesive strips includes a piece of adhesive tape having a first side and a second side, an adhesive substance positioned on both said first and second sides of said adhesive tape and a piece of wax paper secured to said first side of said adhesive tape by said adhesive substance on said first side and to a second side of said adhesive tape of an adhesive strip positioned immediately therebelow by said adhesive substance on said second side, said adhesive tape of each adhesive strip having a length and said piece of wax paper having a length greater than that of the respective piece of adhesive tape secured thereto;

c) a pole; and d) means for releasably connecting said pole to said bottom side of said adhesive member wherein a user directs said adhesive member via said pole to a position in which a topmost one of said plurality of adhesive strips is in contact with the at least one of the bugs and insects causing the at least one of the bugs and insects to adhere to said topmost adhesive strip and thereby trap the at least one of the bugs and insects.

2. The insect adhering device as recited in claim 1, further comprising a cover for selectively protecting said plurality of adhesive strips and said adhesive member from the environment surrounding said device.

3. The insect adhering device as recited in claim 1, wherein each piece of adhesive tape is secured to a central position of said piece of wax paper to which it is secured thereby forming a tab on either side of said piece of adhesive tape.

4. The insect adhering device as recited in claim 3, wherein a topmost one of said plurality of adhesive strips is removed from said plurality of adhesive strips by applying a pulling force to the tabs in a direction away from said plurality of adhesive strips.

5. The insect adhering device as recited in claim 1, wherein said means for connecting includes a recess extending into said bottom side of said adhesive member and a thread spiraling around said recess and said pole includes a thread spiraling around a top side thereof for mating with said thread within said recess.

6. The insect adhering device as recited in claim 1, wherein said pole is connected to extend from said adhesive member at an angle less than 90°.

7. The insect adhering device as recited in claim 1, wherein said top side of said adhesive member extends at an angle to said bottom side of said adhesive member.

8. The insect adhering device as recited in claim 1, wherein said pole is a broom stick.

9. An insect adhering device for catching at least one of bugs and insects and providing easy disposal of the trapped insects, said insect adhering device comprising:

a) an adhesive member having a top side and a bottom side;

b) a plurality of adhesive strips detachably positioned in a layered manner on said top side of said adhesive member;

c) a pole;

d) means for releasably connecting said pole to said bottom side of said adhesive member wherein a user directs said adhesive member via said pole to a position in which a topmost one of said plurality of adhesive strips is in contact with the at least one of the bugs and insects causing the at least one of the bugs and insects to adhere to said topmost adhesive strip and thereby trap the at least one of the bugs and insects; and e) a cover for selectively protecting said plurality of adhesive strips and said adhesive member from the environment surrounding said device, wherein said cover includes at least one protrusion extending into an inner side thereof and said adhesive member includes a side wall and at least one recess extending into said side wall for selectively receiving said at least one protrusion and thereby selectively securing said cover to said adhesive member.

10. The insect adhering device as recited in claim 9, wherein each of said plurality of adhesive strips includes a piece of adhesive tape having a first side and a second side, an adhesive substance positioned on both said first and second sides of said adhesive tape and a piece of wax paper secured to said first side of said adhesive tape by said adhesive substance on said first side.

11. The insect adhering device as recited in claim 10, wherein said piece of wax paper is detachably connected to said second side of said adhesive tape of an adhesive strip positioned immediately therebelow by said adhesive substance on said second side.

12. The insect adhering device as recited in claim 11, wherein said adhesive tape of each adhesive strip has a length and said piece of wax paper has a length greater than that of the respective piece of adhesive tape secured thereto.

13. The insect adhering device as recited in claim 12, wherein each piece of adhesive tape is secured to a central position of said piece of wax paper to which it is secured thereby forming a tab on either side of said piece of adhesive tape.

14. The insect adhering device as recited in claim 13, wherein said means for connecting includes a recess extending into said bottom side of said adhesive member and a thread spiraling around said recess and said pole includes a thread spiraling around a top side thereof for mating with said thread within said recess.

15. The insect adhering device as recited in claim 14, wherein said cover includes at least one protrusion extending into an inner side thereof and said adhesive member includes a side wall and at least one recess extending into said side wall for selectively receiving said at least protrusion and thereby selectively securing said cover to said adhesive member.

16. The insect adhering device as recited in claim 15, wherein said pole is connected to extend from said adhesive member at an angle less than 90°.

17. The insect adhering device as recited in claim 16, wherein said top side of said adhesive member extends at an angle to said bottom side of said adhesive member.

18. The insect adhering device as recited in claim 17, wherein a topmost one of said plurality of adhesive strips is removed from said plurality of adhesive strips by applying a pulling force to the tabs in a direction away from said plurality of adhesive strips.

19. The insect adhering device as recited in claim 18, wherein said pole is a broom stick.

* * * * *